United States Patent
Soni et al.

(10) Patent No.: US 11,003,830 B2
(45) Date of Patent: May 11, 2021

(54) PROVIDING LOCATION-BASED FONT RECOMMENDATIONS

(71) Applicant: Adobe Inc., San Jose, CA (US)

(72) Inventors: Sachin Soni, New Delhi (IN); Ashish Duggal, New Delhi (IN)

(73) Assignee: ADOBE INC., San Jose, CA (US)

( * ) Notice: Subject to any disclaimer, the term of this patent is extended or adjusted under 35 U.S.C. 154(b) by 248 days.

(21) Appl. No.: 15/276,310

(22) Filed: Sep. 26, 2016

(65) Prior Publication Data

US 2018/0089150 A1 Mar. 29, 2018

(51) Int. Cl.
| | |
|---|---|
| *G06K 9/68* | (2006.01) |
| *G06F 40/109* | (2020.01) |
| *G06K 9/00* | (2006.01) |
| *G06F 16/33* | (2019.01) |
| *G06F 16/583* | (2019.01) |
| *G06F 16/58* | (2019.01) |
| *G06F 40/279* | (2020.01) |

(52) U.S. Cl.
CPC .......... *G06F 40/109* (2020.01); *G06F 16/334* (2019.01); *G06F 16/5846* (2019.01); *G06F 16/5866* (2019.01); *G06F 40/279* (2020.01); *G06K 9/00463* (2013.01); *G06K 9/6828* (2013.01); *G06K 2209/27* (2013.01)

(58) Field of Classification Search
CPC .................................................... G06F 17/214
See application file for complete search history.

(56) References Cited

U.S. PATENT DOCUMENTS

| | | | |
|---|---|---|---|
| 2009/0005090 A1* | 1/2009 | Hong .................... | G06F 17/289 455/466 |
| 2011/0137895 A1* | 6/2011 | Petrou ............... | G06F 17/30241 707/723 |
| 2011/0289407 A1* | 11/2011 | Naik ..................... | G06F 17/214 715/269 |
| 2012/0023103 A1* | 1/2012 | Soderberg ............... | G06F 16/58 707/739 |
| 2012/0120104 A1* | 5/2012 | Kuhne ................. | G09B 29/006 345/634 |
| 2012/0308135 A1* | 12/2012 | Mund .................... | G01C 21/32 382/177 |

* cited by examiner

*Primary Examiner* — Maikhanh Nguyen
(74) *Attorney, Agent, or Firm* — Keller Jolley Preece

(57) ABSTRACT

Methods and systems for location-based digital font recommendations determine locations of the images and assign mappings between the identified digital fonts in the images and the locations of the images. Additionally, one or more embodiments detect a location related to content being viewed by a user. In response, one or more embodiments determine a location associated with the content and identify one or more digital fonts associated with the location from a font-location database. Based on the identified digital font(s), one or more embodiments provide a location-based recommendation of digital fonts for use in connection with the content.

20 Claims, 9 Drawing Sheets

| Typekit Font | Location in which font used and corresponding count |
|---|---|
| F1 | Café – 32<br>Casino – 24<br>... |
| F2 | Pharmacy – 102<br>Physiotherapist – 13<br>... |
| ... | ... |
| FN | ... |

*Fig. 2A*

| Typekit Font | Location in which font used and corresponding count |
|---|---|
| F1 | Café – 32<br>Casino Japan – 15<br>… |
| F2 | Pharmacy – 102<br>Physiotherapist – 13<br>… |
| F3 | Casino Las Vegas – 12 |
| FN | … |

PROVIDING LOCATION-BASED FONT RECOMMENDATIONS

BACKGROUND AND RELEVANT ART

Recent years have seen a rapid proliferation in the use of mobile devices in creating and editing electronic documents. Indeed, with the ubiquitous use of tablets and smartphones for both personal and business purposes, individuals and businesses are increasingly generating and modifying electronic documents utilizing mobile devices. For example, individuals and businesses routinely utilize mobile devices to create digital marketing materials, digital magazines, webpages, e-mails, and other electronic documents.

Recent years have also seen an increase in digital fonts utilized in electronic documents. For instance, some contemporary digital editing systems provide access to thousands of digital fonts. Accordingly, individuals and businesses can now access and utilize a wide variety of different digital fonts in generating and modifying electronic documents.

The appearance or style of text affects how people view or interpret a document. For example, stylizing text using a specific digital font can create a mood or atmosphere, emphasize certain parts of a document over others, or provide visual cues. Although the increased number of digital fonts provides numerous options and flexibility for users, the sheer number of digital fonts can also create problems. For example, users often experience frustration in trying to identify digital fonts utilizing conventional digital editing systems. Indeed, searching through thousands of digital fonts offered by conventional systems requires a significant amount of time and effort, and often leads to irritation and dissatisfaction.

User frustration is often exacerbated with regard to conventional digital editing systems operating on mobile devices (e.g., tablets or smartphones). For instance, mobile devices have more limited processing power, reduced multi-tasking capabilities, additional limitations with regard to user interfaces (e.g., mobile devices cannot generally provide multiple simultaneous windows), and more limited memory constraints (e.g., insufficient space for thousands of digital fonts). Thus, for example, a user searching for digital fonts on a smartphone with a touchscreen has more limited screen space to utilize than a traditional desktop computing device. Accordingly, searching for and selecting digital fonts with regard to mobile devices can take additional time and effort and lead to additional frustration and dissatisfaction.

SUMMARY

Embodiments of the present disclosure provide benefits and/or solve one or more of the foregoing or other problems in the art with systems and methods that automatically and intelligently recommend digital fonts based on location. In particular, one or more embodiments of the disclosed systems and methods, provide digital font recommendations for content based on locations associated with the content. Specifically, the methods and systems detect that content is being generated at a client device and determines a location associated with the content. The methods and systems access a database of mappings between locations and digital fonts to determine a digital font associated with the location associated with the content. Based on the mapping, the methods and systems provide a digital font recommendation for use with the content.

The methods and systems assign mappings between digital fonts and locations based on crowd-sourced information. Specifically, the methods and systems receive images that include text captured at a plurality of locations. The methods and systems analyze the images to determine digital fonts in the digital images. The methods and systems also analyze geographical coordinate information from the image metadata to identify a location of the digital images. The methods and systems then map the digital fonts to the identified locations. The methods and systems use the crowd-sourced content (e.g., images and articles) to build a database to determine which digital fonts are used most frequently for specific locations and provide recommendations to content creators that create content associated with various locations.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIGS. 2A-2B illustrate example font-location tables including mappings between locations and digital fonts in accordance with one or more embodiments;

DETAILED DESCRIPTION

Figure 1:
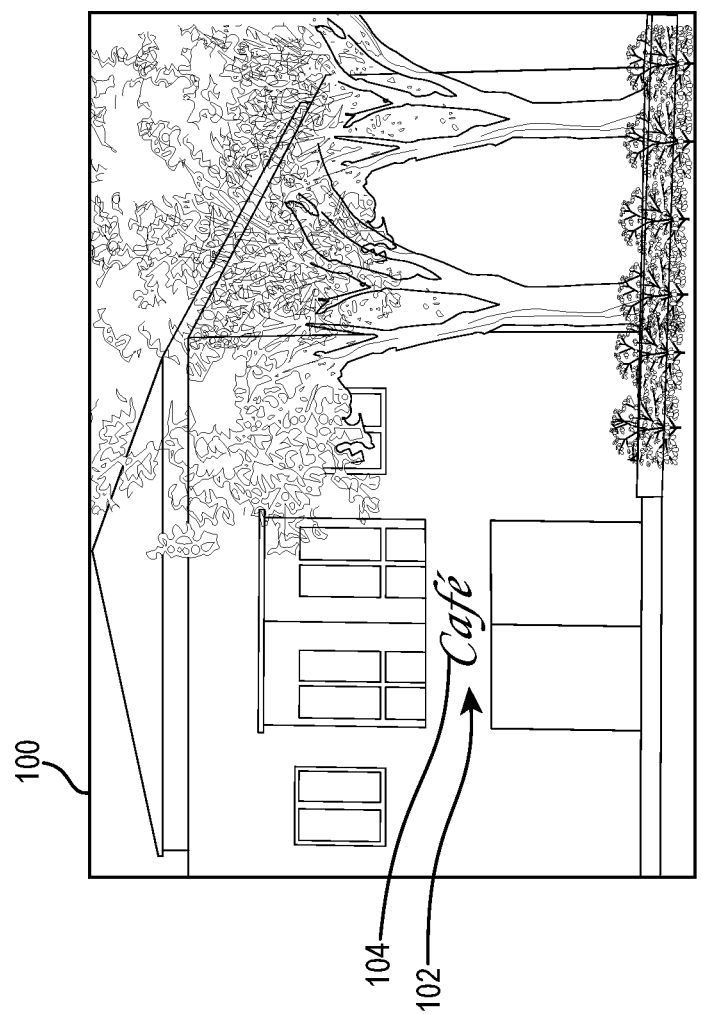
FIG. 1 illustrates an example image including text in accordance with one or more embodiments.

One or more embodiments of the present disclosure provide a digital font management system that provides location-based digital font recommendations. In particular, the digital font management system determines that a user is generating content related to a location. The digital font management system detects a location associated with the content and recommends a digital font for the user to use in connection with the content based on the detected location. For example, the digital font management system determines that other users have used one or more digital fonts at the detected location and recommends those digital fonts for use with the content. As such, the digital font management system provides location-based digital font recommendations to a user consistent with a subject of content being generated by the user.

For example, the digital font management system accesses a plurality of digital images. The digital font management system analyzes the images to detect text and identify digital fonts. The digital font management system also detects a location associated with each digital image. In particular, the digital font management system analyzes metadata of the digital images to identify geographical coordinate information (e.g., GPS data) from the metadata to determine where images were captured. The digital font management system uses the geographical coordinate information to determine the location of the digital image using reverse geocoding. For example, the digital font management system uses the GPS coordinates to identify that a given image was captured at a specific location or at a type of location (park, movie theater, café, etc.).

After identifying the digital fonts and locations associated with a plurality of digital images, the digital font management system establishes mappings between the digital fonts and the locations. For example, the digital font management system stores relationships between digital fonts and locations based on the digital images in a font-location database. The digital font management system uses the database to define the relationships between the digital fonts and the locations, as well as group the locations into one or more categories or subcategories. The digital font management system also uses the database to store the number of instances a given digital font is used with a given location to enable the digital font management system to determine which digital fonts are used most frequently for a given location. Furthermore, the digital font management system can track the number of instances of content that use the digital font with content associated with the given location.

In one or more embodiments, the digital font management system detects that a user is creating or modifying digital content on a client device. For example, the digital font management system detects that a user is creating a content item such as a text document or digital design that contains text. The digital font management system then identifies a location associated with the content. To illustrate, the digital font management system identifies a location in the content by analyzing text to determine that the user mentioned a location within the content.

Based on the identified location in the content, the digital font management system recommends a digital font to the user for use with the content. For example, the digital font management system accesses the font-location database to identify a digital font associated with the location mentioned in the user's content. The digital font management system then recommends the digital font to the content creator for use with the content that mentions the location. Thus, the digital font management system provides location-based digital font recommendations that are relevant to the content that a user is creating.

By searching for and recommending digital fonts based on location, the digital font management system enables users to identify digital fonts quickly and easily. Indeed, in one or more embodiments, the digital font management system automatically recommends digital fonts (e.g., without user input of location). Accordingly, the digital font management system can provide users with access to thousands of digital fonts, while reducing the time and effort required to identify relevant digital fonts.

Furthermore, the digital font management system reduces the time and frustration associated with identifying digital fonts on mobile devices. Indeed, despite various constraints in processing, screen space, operation, and memory of mobile devices, the digital font management system can search thousands of digital fonts and recommend digital fonts to mobile devices based on locations associated with the content on the mobile device. Moreover, upon identifying a digital font desired by a user, the digital font management system can download the additional digital font to the mobile device. Accordingly, users of mobile devices can enjoy the creative benefits of thousands of digital fonts, while avoiding the frustration of searching through large numbers of digital fonts.

In one or more embodiments, the digital font management system preserves valuable space and processing resources on mobile devices by storing digital fonts on one or more remote servers. Indeed, in one or more embodiments, the digital font management system stores digital fonts on a remote server, conducts a search of digital font to identify a subset of digital fonts that are relevant based on location, presents visual representations of the subset of digital fonts on the mobile device, and only downloads particular relevant digital fonts selected for utilization at the mobile device from the remote server. In this manner, the digital font management system provides access to a wide array of digital fonts without unnecessarily exhausting resources of computing devices to store unselected and/or unutilized digital fonts. Accordingly, the digital font management system improves both the speed of computing devices and allows computing devices to devote resources to other computing demands.

Turning now to the figures, additional detail will be provided regarding recommending digital fonts based on location in accordance with one or more embodiments. As alluded above, the digital font management system creates relationships between digital fonts and locations and uses the created relationships to make location-based digital font recommendations. It will be appreciated that the digital font management system can be implemented in a variety of environments and utilizing a variety of components. For example, in relation to FIGS. 1-5, the digital font management system is implemented both as part of a computing device displaying a user interface and as part of a remote server in connection with the computing device via a digital network (e.g., the Internet). In particular, the digital font management system is implemented at least in part as a web-based application hosted on a remote server, and accessible via the Internet. Accordingly, as described in greater detail below, with regard to the embodiments of FIGS. 1-5, the digital font management system can utilize a local computing device and/or one or more remote servers to classify, search, identify, provide, send, or receive digital fonts.

It will be appreciated that other implementations of the digital font management system are also contemplated by the present disclosure. For example, in relations to FIGS. 1-5, the digital font management system may be implemented as one or more operating system components, as one or more stand-alone applications, as one or more modules of an application, as one or more plug-ins, as one or more library functions or functions that may be called by other applications, and/or as a cloud-computing model. Thus, the digital font management system may be implemented as a stand-alone application, such as a desktop or mobile application. Furthermore, the digital font management system may be implemented as one or more web-based applications hosted on a remote server. Furthermore, the digital font management system may be implemented in a suit of mobile device applications or "apps."

Returning to the Figures, FIG. 1 illustrates a digital image 100 that includes text 102. As shown, the digital image 100 includes an image captured at a location that includes text 102. As used herein, the term "location" refers to a specific geographic location or a type of location. For example, a location can be specific location, such as a specific street, a specific address, a specific building (e.g., a particular business, San Francisco City Hall, a notable residence), a site (e.g., a particular national park, Disneyland), a city, a state, a country, etc. Additionally, a location can be a type of a specific location, such, as for example, a restaurant, hospital, hotel, park, etc.

The digital font management system analyzes the digital image 100 to identify a location of the digital image 100. For example, the digital font management system parses the metadata associated with the digital image to identify GPS information (such as GPS coordinates) where the image was captured. According to one or more embodiments, the digital font management system uses GPS information from the metadata to determine a location of the digital image 100. Specifically, the digital font management system can use the GPS information to identify a location to associate with the digital image 100. For example, the digital font management system uses a technique such as reverse geocoding to trace the GPS information to a location (e.g., an address or a location type).

In one or more embodiments, the digital font management system uses a third-party reverse geocoding system. For example, the digital font management system sends the GPS information to a third-party map or reverse geocoding system to determine a location based on GPS information. To illustrate, the digital font management system sends a request with the GPS information for the digital image to a third party mapping system using an API of the third-party mapping system. As part of the request, the digital font management system specifies whether the third-party mapping system should return a specific location (e.g., an address) or a location type. The third-party mapping system returns a location type of "café" to the digital font management system in response to receiving the request with the GPS information of the digital image 100. Alternatively, the digital font management system performs the reverse geocoding without sending the GPS information to another system. In another example, the digital font management system determines the location type on the fly (e.g., create a new location type) if no predetermined location type is available for the location.

According to one or more embodiments, the digital font management system is able to use the content to identify a specific location from a plurality of locations associated with geographical coordinates. For example, a set of geographical coordinates can correspond to a plurality of different locations within the same area. To illustrate, if the digital image 100 has geographical coordinates that correspond to a dense commercial area, the digital font management system can extract the exact location in the image based on the content of the image. The digital font management system can use image processing techniques in combination with reverse geocoding to select a location from a plurality of possible locations in the area (e.g., by comparing identified text in the image to a list of locations).

Additionally, the digital font management system can use similar techniques for identifying a location in an image even if geographical coordinates in the image metadata do not correspond exactly to the location in the image. Specifically, if a user takes an image of text or another object from a distance, the GPS location in the image metadata can correspond to a location that is not exactly the location of the content in the image. The digital font management system can use the GPS location to determine a general area of the location and then identify a location near the GPS location based on the text/object identified in the image. Thus, the digital font management system can accurately identify locations in images even if the GPS locations do not provide an exact match to the locations. In any event, the digital font management system determines a location for the digital image 100.

The digital font management system also analyzes the digital image to identify the text 102. For example, the digital font management system uses image processing techniques to recognize and isolate the text 102 from the rest of the digital image 100. To illustrate, the digital font management system determines that a sign, building, etc. illustrated in the digital image includes text using one or more image processing algorithms. For instance, the digital font management system determines from the digital image 100 of FIG. 1 includes the word "café" written on the building above a door. Identifying the text 102 can also include identifying each character in the text, including determining whether a character is a number, letter or other character.

After identifying the text 102, the digital font management system determines a digital font 104 of the text in the digital image 100. As used herein, the term "digital font" or "digital font" refers to a defined set of digital characters. In particular, the term "digital font" includes a collection of digital characters of a particular style or typeface. A digital font includes digital files with the extensions, such as, but not limited to: .ttf, .otf, .fnt, .abf, .ttc, .suit, .woff, .vnf, .t65, .sfp, .sfd, .pmt, .pfm, .pfb, .pfa, .odtff, .mf, .gdr, .fon, .fnt, .etx, .eot, .compositedigital font, .acfm, .afm, or .amfm. Some example digital fonts include Times New Roman, Helvetica, Arial, Adobe Clean Light, PT Sans Regular, Karmina.

The digital font management system uses digital font recognition techniques to determine whether the text 104 corresponds to one or more recognizable digital fonts. To illustrate, the digital font management system compares the style of the digital font 104 of the text 102 to a database of digital fonts to determine whether the digital font 104 corresponds to any digital fonts in the database. More specifically, in one or more embodiments, the digital font management system utilizes the methods and algorithms described in Zhangyang Wang, Jianchao Yang, Hailin Jin, Eli Schechtman, Aseem Agarwala, Jonathan Brandt, Thomas S. Huang, *DeepDigital font: Identify Your Digital font from An Image*, arXiv:1507.03196 (Jul. 12, 2015), to identify the digital font 104 (and/or identify a similar digital font), the entire contents of which are hereby incorporated by reference in their entirety.

Alternatively, the digital font management system compares the digital font 104 to the digital fonts in the database to select one or more digital fonts that are visually similar to the digital font 104. For example, if the digital font management system determines that the digital font 104 is similar to one or more digital fonts in the database, the digital font management system selects the digital font that appears most similar to the style of the digital font 104. In an alternative example, the digital font management system selects a plurality of digital fonts that are most similar to the digital font 104. The digital font management system can also use a combination of manual digital font recognition and automatic digital font recognition to train one or more algorithms to recognize digital fonts.

In one or more embodiments, the digital font management system determines a digital font that matches or most closely matches the digital font 104 as well as a digital font type/classification corresponding to the digital font 104. For example, the digital font management system determines that the digital font 104 in FIG. 1 is similar to Digital font 1 (i.e., a specific digital font in the digital font database, such as "Times New Roman"). The digital font management system can also determine that the digital font 104 in FIG. 1 is Digital font Type 1 (e.g., a "script" digital font type). The digital font management system can further identify additional characteristics of the digital font 104 including a digital font classification (e.g., Sans Serif, Serif, Slab Serif, Script, Blackletter, Mono, Hand, or Decorative), a digital font weight, a digital font width, an x-height, a contrast, or a capitalization style (e.g., standard or caps only).

After determining the location of the digital image 100 and the digital font 104 of the text 102 in the digital image 100, the digital font management system associates the location with the digital font. Specifically, the digital font management system maintains a font-location database or table of relationships between locations and digital fonts. For example, the digital font management system generates a font-location database that includes mappings between identified digital fonts and locations from a plurality of different digital images.

In one or more embodiments, the digital font management system determines the mappings between the locations and the digital fonts based on the metadata in the digital images. In particular, the digital font management system can store the determined location and/or determined digital font in the metadata of the digital images in connection with each operation, as described above. For example, if the digital font management system determines that the location for a digital image 100 is of a first location type, the digital font management system stores the first location type in the metadata of the digital image 100. Additionally, if the digital font management system identifies the digital font 104, the digital font management system stores the identified digital font in the metadata of the digital image 100. The digital font management system then extracts the stored information from the metadata of various digital images to create the font-location database.

In one or more embodiments, the digital font management system stores the location and/or the digital font directly in the font-location database without first storing the information in the metadata. To illustrate, the digital font management system can determine that the location of the digital image 100 is a first location type and store the first location type in the font-location database. The digital font management system can also identify the digital font 104 is a first digital font and store the first digital font in the font-location database in connection with the first location type. The digital font management system then maps the first location type to the first digital font and stores the mapping in the font-location database.

FIGS. 2A-2B illustrate example tables 200, 250 that include mappings between locations and digital fonts. Specifically, the table 200 of FIG. 2A includes a plurality of relationships between a plurality of digital fonts and a plurality of locations according to a predefined taxonomy. As previously mentioned, the relationships between the locations and the digital fonts in the table are based on a plurality of digital images from a plurality of different users analyzed by the digital font management system as described above in relation to digital image 100. By building a font-location database from a plurality of crowd-sourced images, the digital font management system provides helpful digital font recommendations based on a broad range of different locations and digital fonts.

As illustrated in the table of FIG. 2A, mappings between the digital fonts and location types are indicated based on the row and column in which the information is stored. In particular, a first column 204 includes a plurality of different digital fonts that the digital font management system has identified based on analyzed digital images. Additionally, a second column 206 includes a plurality of location type that the digital font management system has identified from the digital image. The mappings between the digital fonts and the locations are indicated based on the row(s) in which the information is stored in the table. In alternative embodiments, the mappings between digital fonts and location types are stored according to other organization methods (e.g., by storing the information with references to the corresponding digital images), as may serve a particular embodiment.

For example, a first row 208 includes a first digital font (F1) in the first column 204, a second row 210 includes a second digital font (F2) in the first column 204, etc. Additionally, each row includes one or more locations to indicate a mapping to the digital font in the corresponding row. To illustrate, the first row 208 including the first digital font can include a first set of locations in the second column 206 to indicate a mapping between the first digital font and the first set of locations. Similarly, the second row 210 can include a second set of locations in the second column 206 to indicate a mapping between the second digital font and the second set of locations.

Depending on the digital images, a digital font in the table 200 is mapped to a location, as shown. In particular, the digital font management system maps a digital font to a location based on whether the digital font management system identifies the digital font in digital images associated with the location. To illustrate, using the digital image of FIG. 1, the digital font management system can identify the digital font from the digital image and map the digital font to a "café" location based on the digital font management system determining that the geographic coordinates of the digital image correspond to a specific café.

Additionally, as illustrated, a single digital font is can be mapped to a plurality of different locations. As shown in FIG. 2A, the digital font management system maps the first digital font to at least two different location types ("café" and "casino"). The digital font management system maps the first digital font to the different location types based on a determination that digital images at locations with a "café" or "casino" location type include text that is the same as, or similar to, the first digital font. Thus, the digital font management system stores the first digital font in the first column 204 of the first row 208 and the two or more different location types in the second column 206 of the first row 208.

According to one or more embodiments, the digital font management system tracks the number of times a digital font is associated with a location. In particular, after the digital font management system identifies a digital font from a digital image, the digital font management system determines the location associated with the digital image and increments a value for the location in the table. For example, in the second column 206, the digital font management system lists each location with an instance counter that indicates the number of digital images for which the digital font management system identified the digital font for the location. Thus, the table indicates a number of times that the digital font management system has mapped the digital font to each given location. To illustrate, the table 200 of FIG. 2A includes an instance counter for a first location type ("café—32") mapped to the first digital font and a second location type ("casino —24") to indicate the number of times.

Additionally, the digital font management system can map a particular location to more than one digital font. Specifically, because text from different locations can vary, the digital font management system can identify a number of different digital fonts in connection with different locations of a given location. For instance, a first digital image of a first café can include a first digital font and a second digital image of a second café at different geographical coordinates can include a second digital font. In this instance the digital font management system maps the location type of café to both the first and second digital fonts.

In one or more embodiments, the digital font management system further separates the locations into subcategories. FIG. 2B illustrates a table 250 that includes a plurality of subcategories related to a location. In particular, the digital font management system determines that a location is associated with 2 different digital fonts. The digital font management system determines that casinos associated with a first digital font are located in Japan based on the location information from the corresponding digital images. Similarly, the digital font management system determines that casinos associated with a second digital font are located in Las Vegas based on the location information from digital images.

In response to determining that the casinos in different locations are typically associated with different digital fonts, the digital font management system determines that a correlation between the digital font and the location is based on a regional, national, or other geographical location of the digital image. The digital font management system then splits the broad location type into a plurality of subcategories that identify the geographical location of the location type. For example, the digital font management system assigns a location subcategory of "casino Japan" to casinos located in Japan that are associated with the first digital font. Additionally, the digital font management system assigns a location subcategory of "casino Las Vegas" to casinos located in Las Vegas that are associated with the second digital font. FIG. 2B illustrates that the location subcategories associated with the broader location type of "casino" are mapped to different digital fonts and each have a separate instance counter.

Although FIG. 2B illustrates subcategories based on the geographical characteristics of the digital images, the digital font management system can manage subcategories based on other criteria. For example, the digital font management system can generate subcategories based on criteria including, but not limited to, user/professional reviews, size of the location (e.g., physical size, employee count), location demographics (e.g., high/low density population, urban, rural), or other criteria that allows the digital font management system to distinguish the locations. Thus, the digital font management system can use a plurality of different categories and subcategories to determine why a single location type is associated with different digital fonts. The digital font management system can then map the location types (i.e., subcategories of location types) to the different digital fonts for use in providing helpful location-based digital font recommendations.

Figure 3:
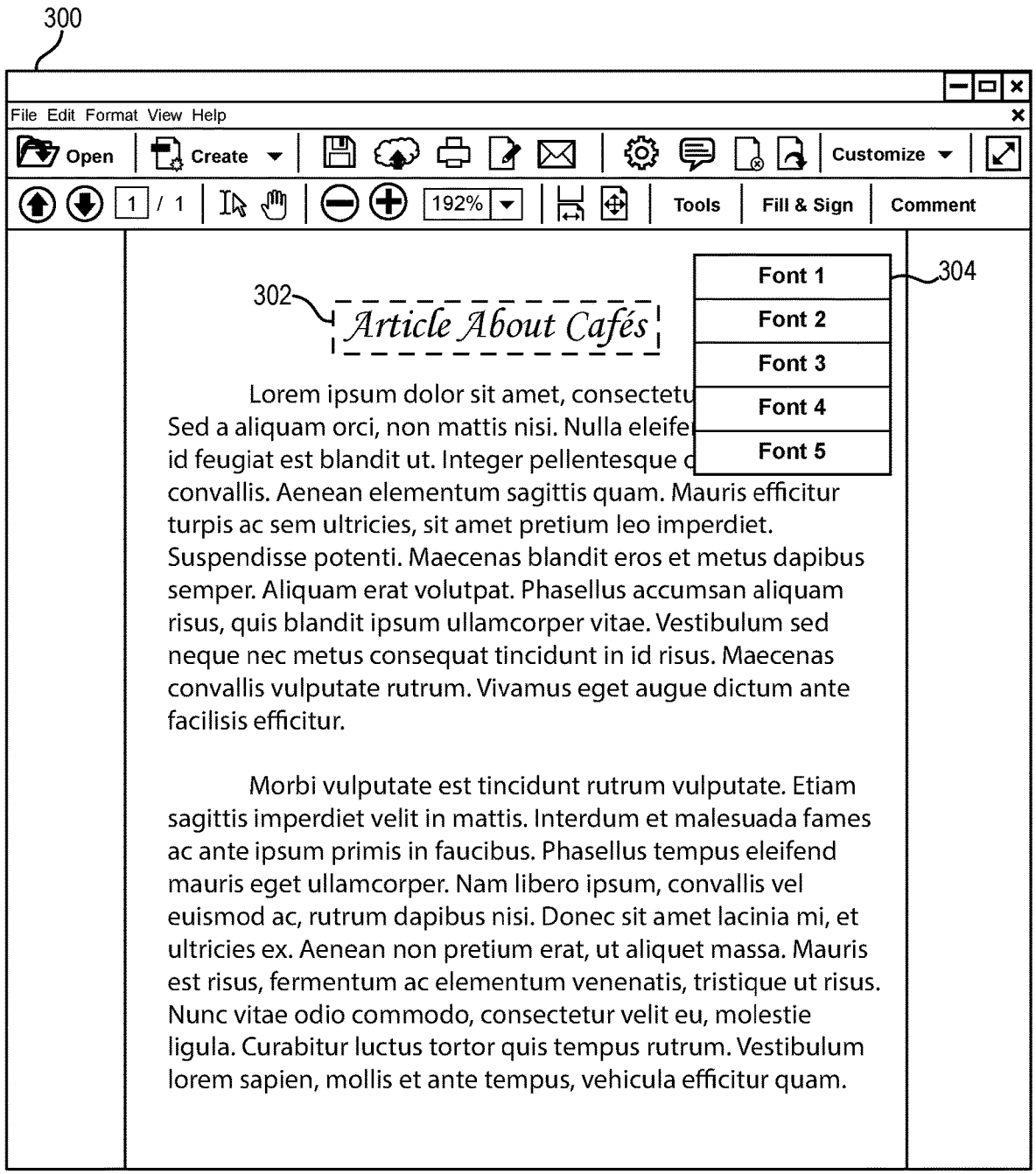
FIG. 3 illustrates an example graphical user interface for generating or manipulating content in accordance with one or more embodiments.

According to one or more embodiments, the digital font management system uses the mappings to provide location-based digital font recommendations. Specifically, the digital font management system determines when a user is creating or modifying content at a client device and provides location-based digital font recommendations to the user based on the content. For example, FIG. 3 illustrates a graphical user interface (GUI) on a client device of a user. The GUI is associated with a client application 300 that runs on the client device.

In one or more embodiments, the client application 300 is an application that allows the user to create new content or modify existing content in an electronic document. As used herein, the term "electronic document" refers to any form of electronic content, regardless of form. For example, an electronic document can include electronic files in the form of a word processing document, a PDF file, an image file, an e-mail file, a text file, a web page, or any other electronic file. An electronic document includes an electronic advertisement, brochure, flyer, or other digital marketing material. Similarly, an electronic document includes an electronic book, magazine, periodical, or other digital publication. Thus, as shown in FIG. 1A, the electronic document 106 comprises a digital advertisement.

The client application 300 can allow the user to create content including, but not limited to, text content, image content, digital designs, video, and/or audiovisual content. In particular, the client application 300 allows a user to create or modify text within a document or file by changing a digital font of the text. For example, the user can edit modifiable text within a document by changing the digital font of the text or setting the digital font of the text to a selected digital font. By setting the text to a specific digital font, the user can establish a tone or atmosphere associated with the document in accordance with the specific digital font.

For instance, the client application 300 can include a word processing application that allows the user to generate text documents. The word processing application can also allow the user to insert images into the text documents, for example, to create articles with visual elements (e.g., images). In another example, the client application 300 includes an image editing application that allows the user to perform a plurality of different operations for creating/modifying an image, including inserting and customizing text. In any case, the client application 300 provides options for the user to set a digital font of text associated with content within the client application.

In one or more embodiments, the digital font management system detects content within the client application 300. For instance, the digital font management system detects that the client application 300 is open and that the user is actively using the client application 300 to insert content into a document, as illustrated in FIG. 3. In particular, the client application 300 communicates with the digital font management system to indicate that the client application 300 is in use and/or that the user is currently creating or modifying content. To illustrate, the client application 300 causes the client device to send a notification to a server device indicating that the user is creating or modifying content. In at least some implementations, the client application is part of a suite of applications that configured to interact with the digital font management system.

In one or more embodiments, the client application 300 notifies the digital font management system that the user is creating or modifying content that relates to a location. To illustrate, the client application 300 analyzes text that the user has generated to determine whether the text includes a text 302 that references a location. For example, if the user is writing an article that refers to a specific location or location type, the client application 300 identifies the location or location type from the text of the article. The client application 300 then provides the location/location type to the digital font management system. Alternatively, the client application 300 detects the use of vocabulary (e.g., using natural language processing techniques) to determine that the user is referencing a location/location type without explicitly reciting the exact location/location type.

In one or more embodiments, the user selects the text 302. In response to the user selecting the text or requesting to change the digital font of the text, the digital font management system identifies one or more digital fonts to provide as recommendations for the text 302. For example, the digital font management system look ups the location identified for the text 302 in the font-location database to determine one or more digital fonts mapped to the location identified for the text 302. To illustrate, in response to determining that the content (e.g., text 302) relates to a "café" location type, the digital font management system identifies one or more digital fonts to which the location type of "café" is mapped. Specifically, the digital font management system identifies all of the digital fonts that the digital font management system previously identified in connection with the location type "café." The digital font management system then selects one or more digital fonts from the identified digital fonts to provide to the client device as location-based recommended digital fonts. For example, the digital font management system selects the digital font with the highest number of instance counters for a location type "café."

In another example, the digital font management system selects a plurality of digital fonts to provide to the client device. As mentioned, the digital font management system identifies all of the digital fonts that are mapped to the location type "café." The digital font management system provides each identified digital font as a location-based recommendation to the client device. To illustrate, the digital font management system determines that the font-location database includes a first digital font, a second digital font, and a third digital font associated with the location type "café." Thus, the digital font management system provides the first digital font, the second digital font, and the third digital font to the client device as location-based recommended digital fonts.

In one or more embodiments, the digital font management system provides a subset of the digital fonts that are mapped to the location type "café." For example, the digital font management system identifies a threshold number of digital fonts. To illustrate, the digital font management system can identify the threshold number based on a limit that the client application imposes. For instance, the digital font management system can determine that the threshold number is five and provide five digital fonts (e.g., the five digital fonts with the highest number of instances associated with the location type "café"). Alternatively, the threshold number of recommended digital fonts is user imposed.

According to one or more embodiments, the digital font management system ranks the digital fonts based on additional information from the client device. Specifically, the digital font management system can prioritize some digital fonts over other digital fonts based on additional information received from the client device. For example, the client device can provide location information of the client device to the digital font management system. To illustrate, the client device provides the location information based on GPS data for the client device or location information based on an IP address of the client device. Alternatively, the client device provides location information corresponding to the content the user is creating based on a location of a publication for which the user is creating the content (e.g., a newspaper, magazine or other publication entity).

The digital font management system then prioritizes the digital fonts associated with a location type based on the location of the client device relative to the location types. To illustrate, the digital font management system can give a higher priority to a location type "casino Las Vegas" than a location type "casino Japan" in response to detecting that the location of the client device is in the United States. The digital font management system can then select a digital font mapped to "casino Las Vegas" based on the selected digital font being weighted higher than a digital font mapped to "casino Japan." As a result, while the user is creating or modifying content, the digital font management system can cause the client device to provide the digital font mapped to the location type "casino Las Vegas."

In one or more embodiments, the digital font management system provides the digital font recommendations within the GUI of the client application 300. In particular, the digital font management system can provide the digital font recommendations to the client device on which the client application is running. In response to the client device receiving the digital font recommendations, the client application 300 displays the digital font recommendations to the user. For example, the client application 300 displays the digital font recommendations in an overlay 304 that includes a list of location-based digital font recommendations. To illustrate, after detecting the location, the client application can automatically, and without user input, display the digital font recommendations in the overlay 304 near text 302.

Additionally, although FIG. 3 illustrates digital font recommendations in an overlay 304, the client application 300 can display the digital font recommendations using other methods. For example, the client application 300 can provide the digital font recommendations in a dropdown menu, a sidebar, or other visual display or section within the GUI. The visual display that includes the digital font recommendations can be customizable, such that the user can move the visual display within the GUI, resize the visual display, or modify the number of digital font recommendations in the visual display.

In one or more embodiments, the digital font management system can also identify the text to which a recommended digital font will apply. To illustrate, the digital font management system determines that the user has selected a digital font from the location-based recommended digital fonts and apply the selected digital font to only the text 302 that references the location. Alternatively, the digital font management system applies the digital font to selected text, to all of the text in a document, or dynamically based on contextual information. Contextual information can include formatting information, such as, but not limited to, whether the location is referenced in a paragraph, a title, or a text box. The digital font management system can thus apply the selected digital font in a variety of ways based on user preferences or automatic detection of various characteristics of the content.

According to one or more embodiments, the content can include references to more than one location. Specifically, the content can include a reference to a first location and a reference to a second location. The client application can provide a notification to the digital font management system of both of the locations. The digital font management system can identify one or more digital fonts related to both of the locations and then provide digital font recommendations for each of the locations. In one example, the digital font recommendation provides a first digital font recommendation for text related to the first location within the content and a second digital font recommendation for text related to the second location within the content.

In any event, once the digital font management system has provided a location-based digital font recommendation, the user can select a recommended digital font. In response to which, the client device can request the selected digital font from the digital font management system. In response, the digital font management system downloads the digital font (e.g., the selected location-based recommended digital font) to the client device of the user. Upon downloading the selected location-based recommended digital font, the client device of the user installs and registers the selected location-based recommended digital font. In particular, the client device installs and registers the selected location-based recommended digital font so that the client device can utilize the selected location-based recommended digital font within the electronic document. Accordingly, the digital font management system can automatically recommend and provide additional digital fonts without unnecessarily tying up resources (i.e., storage space and processing power) in relation to a client device.

One will appreciate in light of the disclosure in relation to FIG. 3 that the digital font management system can aid a user in identifying a suitable digital font based on a location related to the content to which the digital font will be applied. For example, a user may be creating an article about Venice, Italy and desire suitable digital font recommendations. The digital font management system can provide location-based digital font recommendations based on the use of the digital fonts in digital images captured in Venice, Italy. Thus, the digital font management system can allow a user, who has not visited Venice, Italy, to be inspired by digital fonts commonly used in Venice, Italy.

In addition, the digital font management system can also utilize a search query or filter to provide location-based digital font recommendations. For example, the user can browse the digital fonts maintained by the digital font management system. As part of browsing the digital fonts, the user can enter a search query. For example, the user can enter a search query "Venice, Italy digital fonts." In response to the search query, the digital font management system can query the font-location database and return the digital fonts associated with Venice, Italy as described above.

As another example, the digital font management system filers digital fonts based on location. In particular, the digital font management system can filter the digital fonts based on location in response to user input. For example, in response to the user selecting to filter digital fonts associated with Italy, the user digital font management system can filter a list of digital fonts to include only the digital fonts associated with Italy in the font-location database.

In still further embodiments, the digital font management system can filter similar digital fonts or recognize digital fonts based on location. For example, in one or more embodiments, the digital font management system identifies a list of digital fonts that are similar to a digital font used in content. The digital font management system then determines a location of the content (e.g., using metadata or an analysis of the content). The digital font management system then determines the number of times each digital font in the list of digital fonts has been previously used in content or images associated with the determined location. The digital font management system then sorts or filters the digital fonts in the list of similar digital fonts based on the determined use of each digital font with the given location.

In still further embodiments, the digital font management system can leverage the font-location database to aid in font recognition. For example, referring again to FIG. 1, a user may desire to recognize the digital font 104 in the digital image 100. The digital font management system can generate a list of digital fonts similar to the digital font 104 using a font recognition algorithm, such as those described in *DeepDigital font: Identify Your Digital font from An Image*, arXiv:1507.03196 (Jul. 12, 2015).

The digital font management system can then determine a location of the digital image 100 (such as where the image was captured). For example, the digital font management system can extract geographic coordinates from metadata associated with the digital image 100. The digital font management system then can perform reverse geo-coding using the geographic coordinates to identify a location of the digital image 100.

The digital font management system can use the font-location database to determine the number of times that each digital font in the list of similar digital fonts has been recognized in digital images with locations matching the location of the digital image 100. The digital font management system then filters the list of similar digital fonts based on the determined number of times that each digital font in the list of similar digital fonts has been recognized in digital images with locations matching the location of the digital image 100. In yet further embodiments, the digital font management system using the mappings of particular fonts to particular locations as a feature in the machine learning algorithms described in *DeepDigital font: Identify Your Digital font from An Image*, arXiv:1507.03196 (Jul. 12, 2015) to aid in recognizing digital fonts.

Figure 4:
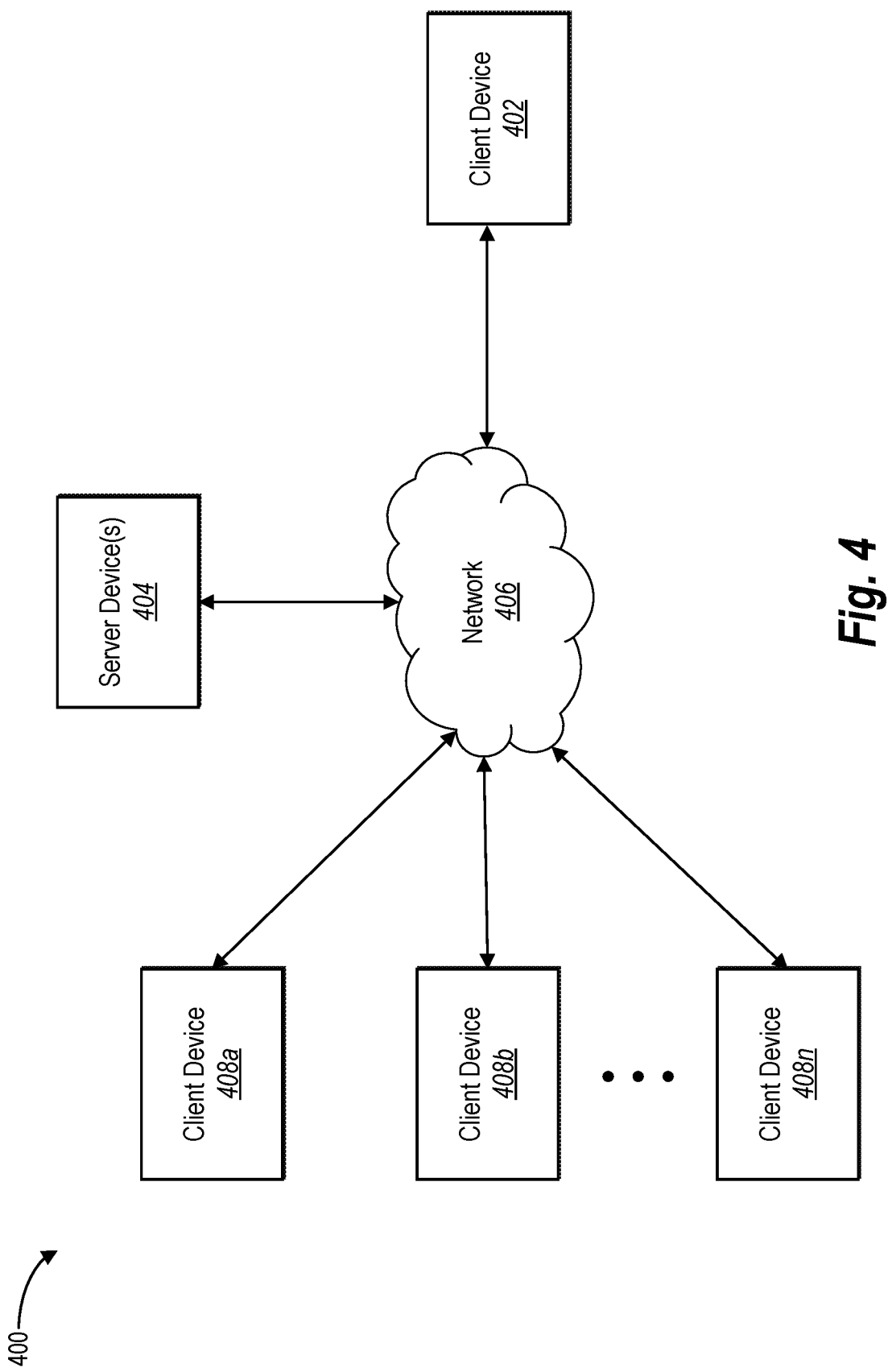
FIG. 4 illustrates an example environment in which a digital font management system operates in accordance with one or more embodiments.

Turning now to FIG. 4 is a schematic diagram illustrating an environment in which the digital font management system 400 can operate. As illustrated by FIG. 4, the environment 400 includes a first client device 402, server device(s) 404, one or more additional client devices 408a, 408b, 408c, and a network 406. The network 406 may be any suitable network over which the computing devices can communicate. The client devices 402, 408a, 408b, 408c may comprise one or more personal computers, laptop computers, mobile devices, mobile phones, tablets, special purpose computers, televisions, or other computing devices, including computing devices described below with regard to FIG. 8

In one or more embodiments, the server(s) 404 can comprise of at least a portion of the digital font management system and perform the at least some of the functions and method described above. Furthermore, the server(s) 404 can include a database of digital fonts. For example, in one or more embodiments, the server(s) 404 comprise the ADOBE® TYPEKIT® cloud-based digital font service. In still further embodiments, the server(s) 404 comprise or have access to a database of digital images. For example, in one or more embodiments, the server(s) 404 comprise the ADOBE® STOCK® cloud-based digital image service. Thus, the server(s) 404 can comprise or access digital images and/or metadata from a plurality of client devices 408a-408n.

The digital font management system allows the server device(s) 404 to analyze the digital images and/or metadata. The server device(s) 404 analyze the plurality of images to identify text and locations associated with the plurality of images. Using the text and location information from the digital images, the server device(s) 404 maintain a font-location database (e.g., table 200/250) including digital fonts and locations learned from the digital images. In particular, the server device(s) 404 determine relationships between digital fonts based on the text and the locations corresponding to the images and stores the relationships in the font-location database. The server device(s) 404 generate the font-location database to include mappings that describe the relationships between the digital fonts and the locations corresponding to the images and maintain the table for use in providing location-based digital font recommendations. The server device(s) 404 can also use content from articles or other documents (e.g., articles) related to the locations to further define the relationships between the digital fonts and the locations.

As mentioned, the server(s) 404 comprise the digital font management system. In particular, the digital font management system can comprise an application running on the server(s) 404 or a portion of a software application that can be downloaded from the server(s) 404. For example, the digital font management system can include a web hosting application that allows the client devices 402, 408a-408n to interact with content hosted at the server(s) 404. To illustrate, in one or more embodiments of the exemplary environment 400, client devices can access a webpage supported by the server(s) 404. In particular, the client device 402 can run a web application (e.g., a web browser) to allow a user to access, view, and/or interact with a webpage or website hosted at the server(s) 404.

The server device(s) 404 also communicate with the first client device 402 to detect the first user is creating/modifying content using the first client device 402. By way of example, in one or more embodiments, the client device 402 generates an electronic document comprising digital text with a first digital font. The first client device 402 then communicates the content in the electronic document, or an indication of a location associated with the content to the server device(s) 404. The server device(s) 404 then communicate with the first client device 402 to provide a location-based digital font recommendation based on the location corresponding to the content. The client device 402 receives user input of a selection of one of the recommended digital fonts and sends a request to the server(s) 404 to download the selected digital font. The server(s) 404 download the selected digital font to the client device 402. The client device 402 installs the selected digital font and utilizes the selected digital font.

Although FIG. 4 illustrates a particular arrangement of the client devices 402, 408a-408n, the network 406, and the server(s) 404, various additional arrangements are possible. For example, the digital font management system can be implemented on a single computing device. In particular, the digital font management system may be implemented in whole by the client device 402 or the digital font management system may be implemented in whole by the server(s) 404. Alternatively, the digital font management system may be implemented across multiple devices or components.

By way of example, in one or more embodiments, the client device 402 executes or launches an application to generate or modify an electronic document comprising digital text with a first digital font. The client device 402 can use a local copy of a font-location database to recommend location-based digital font recommendations based on the content of the electronic document.

Figure 5:
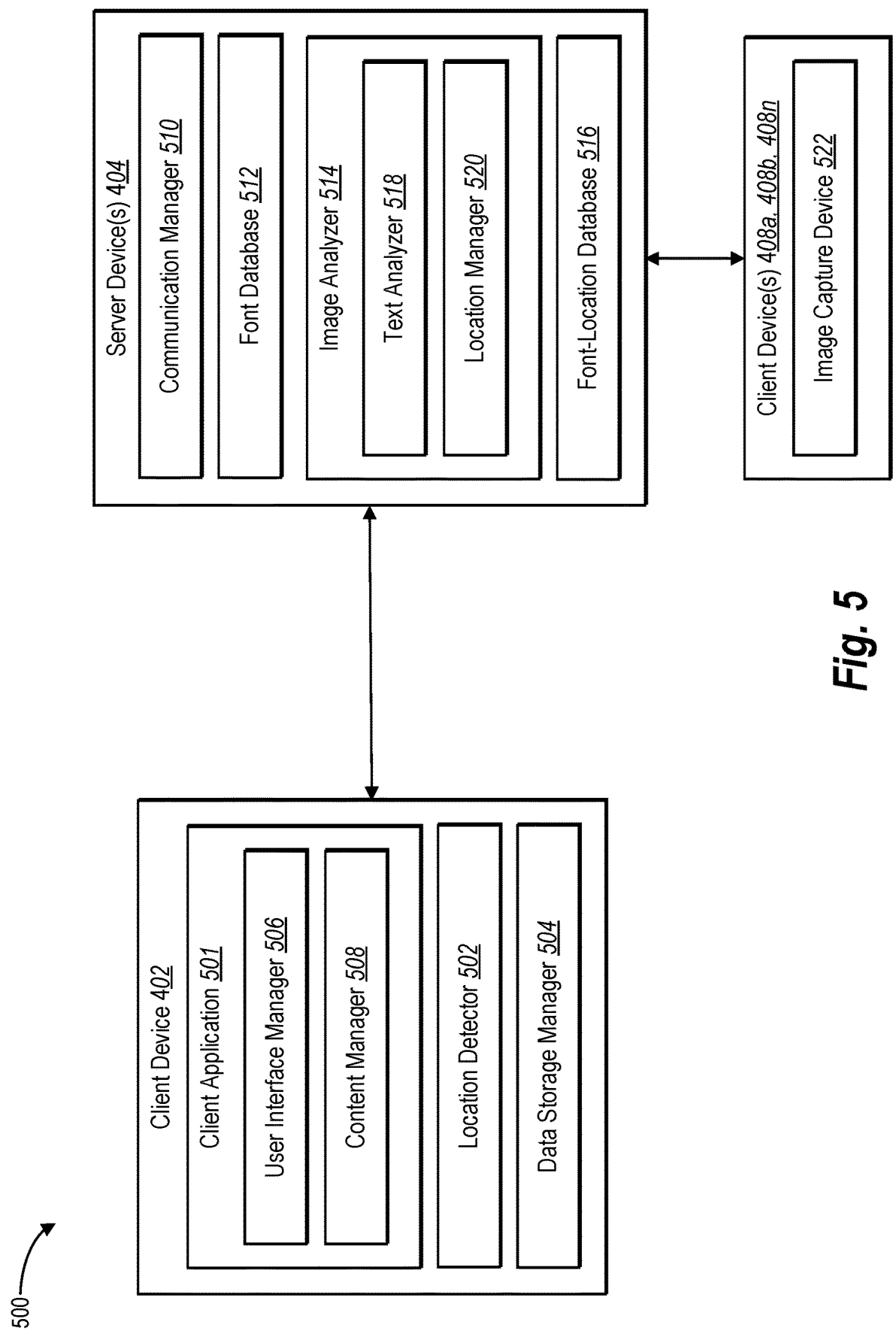
FIG. 5 illustrates a schematic diagram of a digital font management system in accordance with one or more embodiments.

By identifying relationships between digital fonts and locations using crowd-source images and other crowd-sourced content, the digital font management system can provide location-based digital font recommendations to content creators based on the nature of the content created. FIG. 5 illustrates a schematic diagram of a digital font management system 500 including a client device 402 and server device(s) 404 for performing one or more operations of the digital font management system 500 described herein.

As illustrated, the client device 402 includes a client application 501 that runs on the client device 402, a location detector 502, and a data storage manager 504. The client application 501 includes a user interface manager 506 and a content manager 508. The server device(s) 404 include a communication manager 510, a digital font database 512, an image analyzer 514, and a font-location database 516. The image analyzer 514 at the server device(s) 404 includes a text analyzer 518 and a location manager 520. Additionally, the server device(s) 404 can be in communication with the client devices 408a, 408b, 408n that include an image capture device 522 for capturing and providing crowd-sourced images to the font management system 500 for building the font-location database 516.

Although the components of the digital font management system 500 are shown to be separate in FIG. 5, any of the components may be combined into fewer components, such as into a single component, or divided into more components as may serve a particular implementation. Furthermore, although the components of FIG. 5 are described in connection with the digital font management system 500, at least some of the components for performing operations in conjunction with the digital font management system 500 described herein may be implemented on other devices and/or with other systems.

The components of the digital font management system 500 can include software, hardware, or both. For example, the components of the digital font management system 500 (e.g., the components of the client device 402 and the components of the server device(s) 404) can include on or more instructions stored on a computer-readable storage medium and executed by processors of one or more computing devices such as the client device 402 and/or the server device(s) 404. When executed by the one or more processors, the computer-executable instructions of the digital font management system 500 cause the computing devices to perform the digital font recommendation processes described herein. Alternatively, the components of the digital font management system 500 comprise hardware, such as a special purpose processing device to perform specific functions associated with digital font management processes. Additionally, the components of the digital font management system 500 can comprise a combination of computer-executable instructions and hardware.

Furthermore, the components of the digital font management system 500 performing the functions described herein with respect to the digital font management system 500 may, for example, be implemented as part of a stand-alone application, as a module of an application, as part of a suite of applications, as a plug-in for applications including content creation applications, as a library function or functions that may be called by other applications, and/or as a cloud-computing model. Thus, the components of the digital font management system 500 may be implemented as part of a stand-alone application on a personal computing device or a mobile device. Alternatively or additionally, the components of the digital font management system 500 may be implemented in any application that allows delivery of content to users, including, but not limited to, applications in ADOBE® CREATIVE CLOUD®, ADOBE® PHOTOSHOP®, ADOBE® DIGITAL PUBLISHING SUITE®, and ADOBE® INDESIGN®. "ADOBE", "CREATIVE CLOUD", "PHOTOSHOP", "ADOBE DIGITAL PUB- LISHING SUITE", and "INDESIGN" are registered trademarks of Adobe Systems Incorporated in the United States and/or other countries.

As previously described the digital font management system 500 of FIG. 5 includes a client device 402 that includes a client application 501. The client application 501 allows a user to create and/or modify content on the client device 402. Specifically, the client application 500 includes a user interface manager 506 to facilitate management and display of content in a GUI. The user interface manager 506 can determine which content to display and where to display the content in the GUI. For example, the user interface manager 506 manages a display of content that the user creates, including text styling such as digital fonts.

The client application 501 also manages the display of digital font recommendations from the server device(s). In particular, after the client device 402 receives one or more digital font recommendations from the server device(s) 404 in connection with a detected location in the content, the user interface manager 506 determines how to display the digital font recommendations and how many to display in the GUI. For example, the user interface manager 506 can determine which ones to display and how to display them based on user preferences, default settings of the client application 501, and the number of digital font recommendations.

The client application 501 also includes a content manager 508 to facilitate management of content within the client application 501. Specifically, the content manager 508 detects when the user is creating or modifying content within the client application 501. The content manager 508 can also analyze the content to determine whether the content includes a reference to one or more locations. For instance, the content manager 508 can analyze text in the content using language processing techniques to identify explicit references to locations or contextual references to locations. The content manager 508 can also determine a structure of the content and identify a position of the reference(s) to location(s) relative to the determined structure of the content.

The client device 402 further includes a location detector 502 to detect location information associated with the client device 402. For example, the client device 402 can include hardware and/or software components that allow the client device 402 to identify a general and/or specific location of the client device 402. To illustrate, the client device 402 can include a GPS locator or use wireless information to identify a location of the client device 402. The digital font management system 500 can use the location information along with content information to provide digital font recommendations to the user.

The client device 402 also includes a data storage manager 504 to store and maintain data on the client device. In particular, the data storage manager 504 can communicate with the other components of the client device 402 to store data associated with the digital font recommendation processes described herein. The data storage manager 504 can also provide the data to one or more of the components in connection with the digital font recommendation processes. For example, the data storage manager 504 can store information including, but not limited to, content that the user is creating/modifying, location data, digital fonts, and text styling information.

As mentioned, the server device(s) 404 include a communication manager 510. The communication manager 510 facilitates communication between the server device(s) 404 and the client device 402. For example, the communication manager 510 allows the server device(s) 404 to communicate with the client device 402 to receive information from the client device 402 related to content. To illustrate, the communication manager 510 can receive notifications from the client device 402 related to content that the user is generating/modifying/viewing, including location information or contextual information from the content. Additionally, the communication manager 510 can receive location information for the client device 402.

The server device(s) 404 also include a digital font database 512. Specifically, the digital font database 512 includes a plurality of digital fonts that are available to the digital font management system 500. The digital fonts in the digital font database 512 can include a variety of different digital fonts, as well as digital fonts that are related to one or more other digital fonts in the database. The digital font database 512 can organize the digital fonts by including additional information with the digital fonts, such as digital font style (e.g., bold, italic, thin, wide, serif/sans-serif, script), digital font family (i.e., related digital fonts).

The server device(s) 404 also include an image analyzer 514 that includes a text analyzer 518 and a location manager 520. The text analyzer 518 facilitates analysis of a plurality of captured images to identify text within the images. For example, the text analyzer 518 uses image processing techniques to determine whether an image contains text. The text analyzer 518 also processes the images to further analyze the text to identify one or more digital fonts that are visually similar to the text in the images. Thus, the text analyzer 518 provides digital font recognition capabilities to the digital font management system 500 for building the font-location database.

The image analyzer 514 also includes a location manager 520 to facilitate the identification of a location for each captured image. Specifically, the location manager 520 analyzes image metadata to determine whether the image includes geographical coordinates such as GPS data. The location manager 520 can perform reverse geocoding to identify an address or name of the location from the geographical coordinates. For example, the location manager 520 can perform the reverse geocoding at the server device(s) 404 or provide the geographical coordinates to a third-party system to obtain the location. In one or more embodiments, determining the location also determines a location type for the location.

Additionally, the location manager 520 can use content in the image to identify the location, such as to pinpoint the location from a plurality of locations near the geographical coordinates. For example, if the geographical coordinates return a plurality of possible locations for the image based on proximity, the location manager 520 can use image processing techniques to further narrow the results. To illustrate, the location manager 520 can use the text from the image to identify a location from the plurality of possible locations based on a similarity of the text to a name of the location.

The server device(s) 404 also include a font-location database 516 that facilitates digital font recommendations in connection with created content. As previously described, the font-location database 516 includes mappings between digital fonts and locations based on how frequent the digital fonts appeared in content related to the locations. The font-location database 516 can generate and store a plurality of mappings from training content (e.g., images, articles). The mappings describe the relationships between the digital fonts and the locations for use in providing digital font recommendations based on the relationships. In one or more embodiments, the mappings describe the relationships between digital fonts and location types based on the locations in the training content.

Furthermore, the font-location database 516 can retrieve the mappings in response to receiving an indication of a location of content at the client device 402. For example, the communication manager 510 can notify the font-location database 516 that the user is generating/modifying/viewing content at the client device and provide a location from the content to the font-location database. The font-location database 516 can look up the location in the plurality of mappings to identify one or more digital fonts mapped to the location.

In one or more embodiments, the server device(s) 404 also communicate with one or more client devices 408*a*, 408*b*, 408*n* to obtain a plurality of images or other training content for building the font-location database 516. Each of the client devices 408*a*, 408*b*, 408*n* can include an image capture device for capturing images at a variety of different locations. The client devices 408*a*, 408*b*, 408*n* can be, for example, user's smartphones or digital cameras capable of taking digital images. In at least some embodiments, the client devices 408*a*, 408*b*, 408*n* are associated with a plurality of different users who have opted into providing content to the digital font management system 500 or an associated system.

FIGS. 1-5, the corresponding text, and the examples, provide a number of different systems and devices for providing digital font recommendations to content creators. In addition to the foregoing, embodiments can be described in terms of flowcharts comprising acts and steps in a method for accomplishing a particular result. For example, FIGS. 6 and 7 illustrate flowcharts of exemplary methods in accordance with one or more embodiments.

Figure 6:
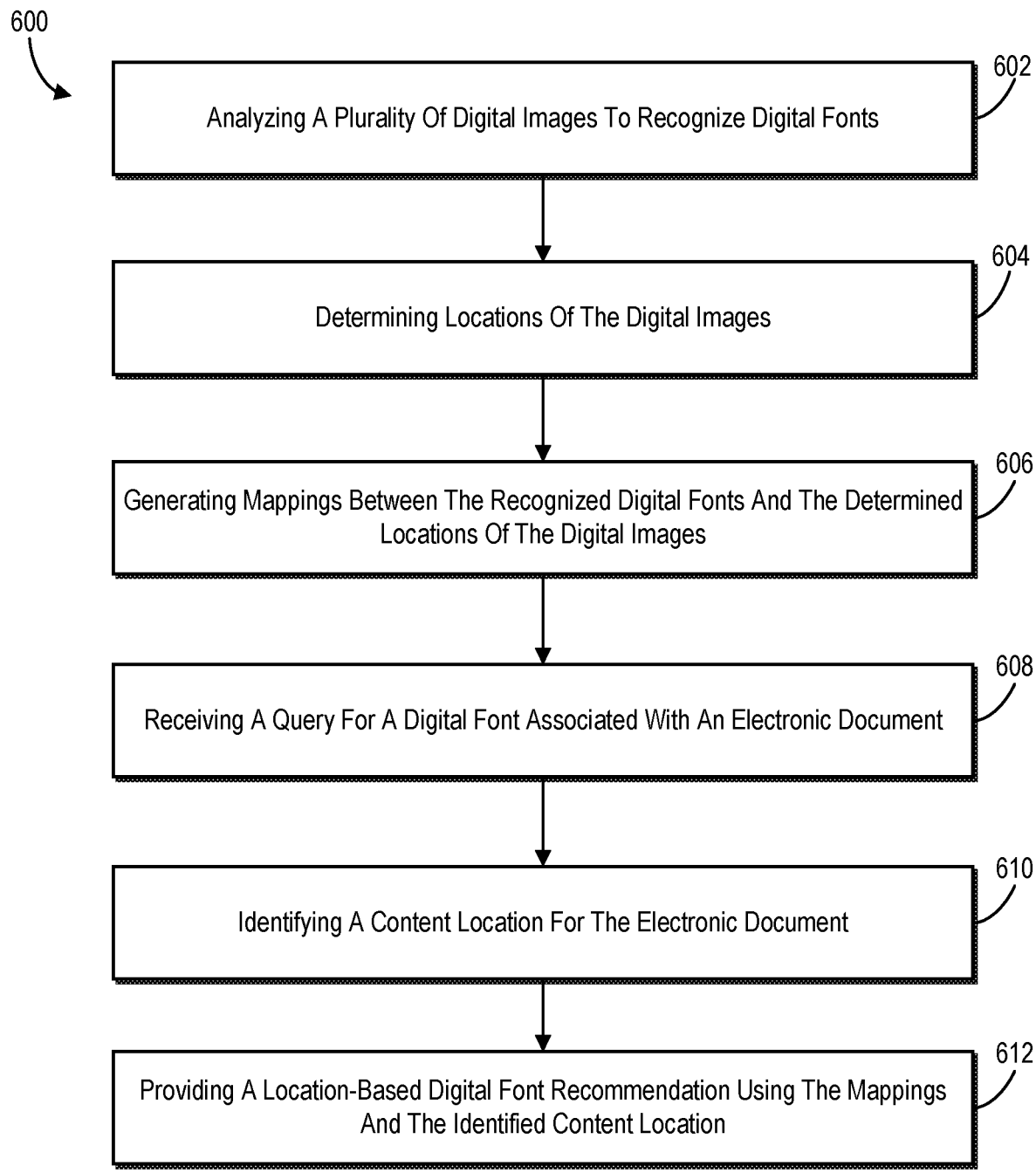
FIG. 6 illustrates a flowchart of a series of acts in a method of providing location-based digital font recommendations in accordance with one or more embodiments.
Figure 7:
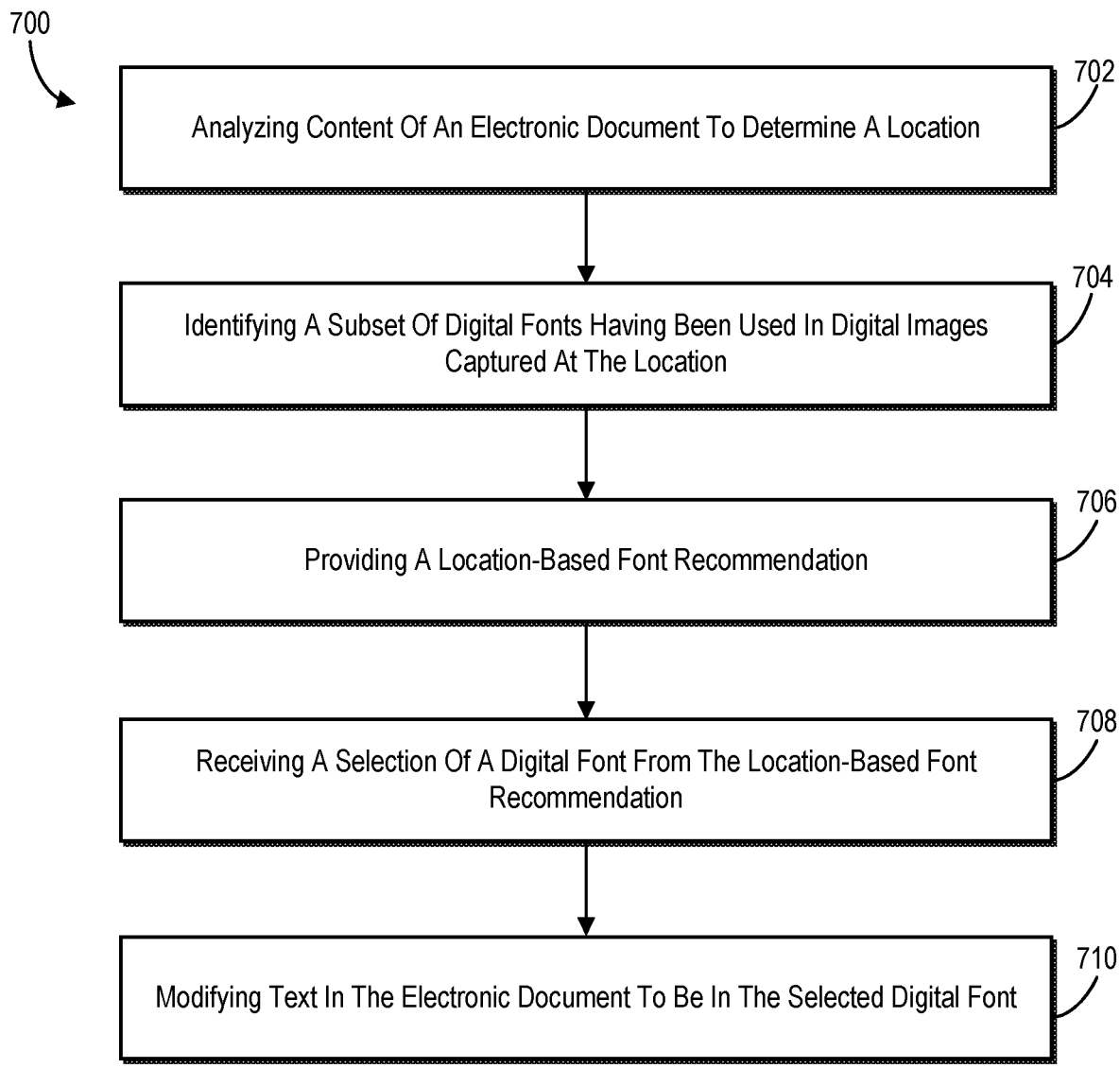
FIG. 7 illustrates a flowchart of a series of acts in another method of providing location-based digital font recommendations in accordance with one or more embodiments.

FIG. 6 illustrates a flowchart of a series of acts in a method 600 of providing location-based digital font recommendations. The method 600 includes an act 602 of analyzing a plurality of digital images to recognize digital fonts. Act 602 can involve applying an image processing algorithm to the plurality of digital images to identify the text in the plurality of digital images, and recognizing the digital fonts based on a similarity of the digital fonts to a plurality of digital fonts in a font database.

For example, the digital images can include photographs of text at the determined location. Act 602 can also involve analyzing a plurality of captured images of text at a plurality of different locations. To illustrate, act 602 can involve analyzing a plurality of training images corresponding to a plurality of different locations.

The method 600 also includes an act 604 of determining locations of the digital images. For example, act 604 can involve identifying geographic coordinates from metadata associated with the digital images, and reverse geocoding the geographic coordinates to identify location types. To illustrate, act 604 can involve identifying GPS information from the metadata of the digital images, and reverse geocoding the GPS information to determine a street address or name of the determined location.

The method 600 further includes an act 606 of generating mappings between the recognized digital fonts and the determined locations of the digital images. For example, act 606 can involve generating a mapping by establishing an association between a recognized digital font and a determined location of one or more digital image in a table of mappings. Additionally, act 606 can involve determining an instance count for each recognized digital font —location mapping by aggregating a number of times each recognized digital font is used in digital images with a determined location. For example, act 606 can involve incrementing the instance count for a recognized digital font each time the recognized digital font is used in a digital image at the determined location.

As part of act 606, or as an additional act, the method 600 can include identifying a plurality of subcategories associated with a location type, each subcategory from the plurality of subcategories corresponding to a geographic region, and associating a subcategory from the plurality of subcategories with a recognized digital font based on the geographic coordinate information for a digital image including the recognized digital font being within the geographic region associated with the selected subcategory.

Additionally, the method 600 includes an act 608 of receiving a query for a digital font associated with an electronic document. For example act 608 involves receiving a query for a digital font, the query being associated with an electronic document. Act 608 can also involve receiving a request to recognize a digital font in a digital image. Additionally, act 608 can involve receiving the query at a server from a client device.

The method 600 also includes an act 610 of identifying a content location for the electronic document. For example, act 610 involves identifying a content location associated with content of the electronic document. Act 610 can also involve analyzing text of the electronic document, and identifying the content location from the text of the electronic document. For example, act 610 can involve determining that the text of the electronic document includes the content location.

The method 600 includes an act 612 of providing a location-based digital font recommendation using the mappings and the identified content location. For example, act 612 involves providing a location-based digital font recommendation using the mappings of the recognized digital fonts to the determined locations and the identified content location. Act 612 can also involve identifying a predetermined number of digital fonts having the highest instance counts for the determined location of the content location.

Act 612 can further involve identifying similar digital fonts to the digital font in the digital image, and filtering the similar digital fonts based on whether the similar digital fonts having a mapping to the content location.

Act 612 can involve determining one or more digital fonts associated with the content location using the mappings of the recognized digital fonts to the determined locations, and including the one or more digital fonts in the location-based digital font recommendation.

The method 600 can also include an act of receiving user input identifying a selected digital font from the location-based digital font recommendation, and downloading, by the server, the selected digital font to the client device.

FIG. 7 illustrates a flowchart of a series of acts in a method 700 of providing location-based digital font recommendations. The method 700 includes an act 702 of analyzing content of an electronic document to determine a location. For example, act 702 involves analyzing content of an electronic document to determine a location associated with the content. Additionally, act 702 can involve analyzing text of the electronic document using natural language processing to identify an instance of the location in the text of the electronic document.

The method 700 includes an act 704 of identifying a subset of digital fonts having been used in digital images captured at the location. For example, act 704 involves, based on the determined location, identifying, from a plurality of digital fonts, a subset of digital fonts having been used in digital images captured at the location. Act 704 can also involve querying a font-location database at the remote server. In one or more embodiments, the location is a type of location.

The method 700 can further include analyzing a plurality of digital images to recognize digital fonts in the plurality of digital images, determining locations of the plurality of digital images by identifying geographic coordinates from metadata associated with the plurality of digital images, reverse geocoding the geographic coordinates to identify locations, generating mappings between the recognized digital fonts and the determined locations of the plurality of digital images, and using the mappings to identify the subset of digital fonts having been used in the digital images captured at the location.

The method 700 also includes an act 706 of providing a location-based font recommendation. For example, act 706 involves providing a location-based font recommendation comprising one or more of the digital fonts from the identified subset of digital fonts having been used in the digital images captured at the location.

As part of act 706, or as an additional act, the method 700 can include determining an instance count for each digital font in the subset of digital fonts by identifying a number of times each digital font in the subset of digital fonts is used in digital images with captured at the location, and wherein providing the location-based digital font recommendation comprises identifying a predetermined number of digital fonts having the highest instance counts for the location.

Act 706 can also involve determining digital fonts similar to a used digital font in the electronic document, identifying at least one digital font similar to the used digital font that is in the subset of digital fonts having been used in the digital images captured at the location, and including the at least one digital font in the location-based font recommendation.

Additionally, the method 700 includes an act 708 of receiving a selection of a digital font from the location-based font recommendation. For example, act 708 can involve receiving a selection to apply the digital font from the location-based font recommendation to text in the electronic document. Additionally, act 708 can involve selecting the digital font from a plurality of fonts from the location-based font recommendation.

The method 700 further includes an act 710 of modifying text in the electronic document to be in the selected digital font. For example, act 710 can involve setting a font of the text in the electronic document to the selected digital font. Act 710 can also involve setting a font for only a selected portion of the text in the electronic document to be in the selected digital font. For example, act 710 can involve setting text that includes the determined location to be in the selected digital font. Additionally, act 710 can involve setting a first subset of text to be in the selected digital font and a second subset of text to be in a second digital font.

As part of act 710, or as an additional act, the method 700 can include downloading, from a remote server, the selected digital font. For example, the method 700 can include, in response to detecting the selection of the digital font from the location-based font recommendation, downloading the selected digital font from the remote server and applying the selected digital font to the text in the electronic document.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
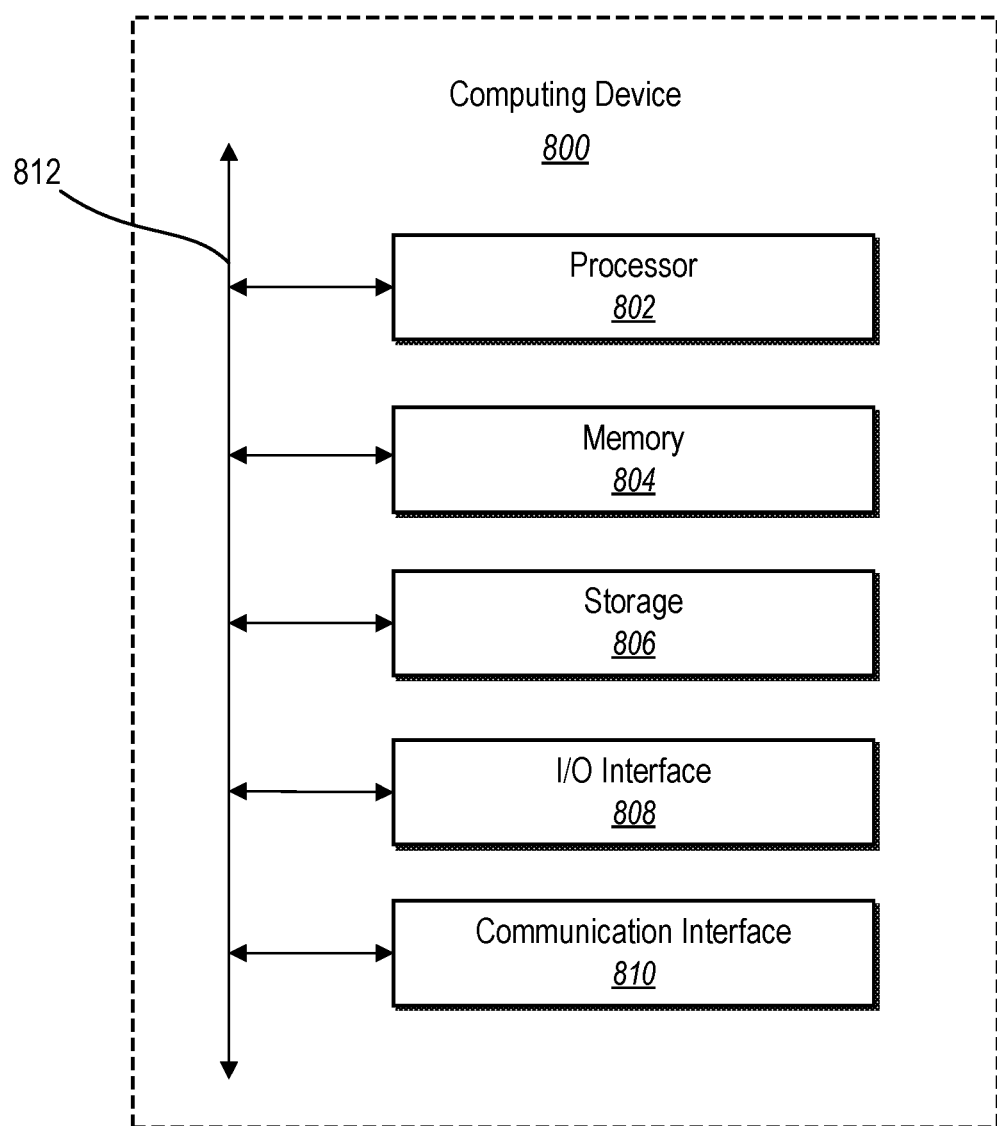
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the digital font management system 500. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the digital font management and recommendation process can allow a plurality of devices (e.g., a client device and server devices) to exchange information using various communication networks and protocols for recommending digital fonts such as crowd-sourced images, generated content, and location information.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment comprising electronic documents and digital fonts that can be applied to modify text within the electronic documents, a computer-implemented method of providing location-based digital font recommendations comprising:
   analyzing, using image processing, a plurality of digital images comprising photographs captured by one or more image capture devices to recognize digital fonts of text in the photographs;
   determining locations of the digital images, the determined locations corresponding to geographic locations of content captured in the digital images;
   determining, for each digital image of the plurality of digital images, a location type corresponding to a location subcategory associated with the determined location of the digital image;
   generating mappings between the recognized digital fonts of the text in the photographs, the determined locations of the digital images, and location types corresponding to the location subcategory;
   receiving, from a client device, a query for a digital font, the query being associated with an electronic document;
   identifying a content location type referenced within user-generated text content of the electronic document and a location of the client device used to generate the electronic document; and
   providing a location-based digital font recommendation to apply to the user-generated text content of the electronic document based on the mappings, the identified content location type, and the location of the client device by:
      determining a digital font mapped to the content location type identified for the user-generated text content; and
      filtering a list of similar digital fonts to the digital font mapped to the content location type identified for the user-generated text content based on the similar digital fonts having a mapping to the content location type.

2. The computer-implemented method as recited in claim 1, further comprising:
   determining the list of similar digital fonts to the digital font mapped to the content location type identified for the user-generated text content by utilizing a font recognition algorithm.

3. The computer-implemented method as recited in claim 1, wherein the digital images comprise photographs of text on signs or buildings at the geographic locations of content captured in the digital images.

4. The computer-implemented method as recited in claim 1, further comprising:
   receiving, at a server from the client device, user input identifying a selected digital font from the location-based digital font recommendation; and
   downloading, by the server, the selected digital font to the client device.

5. The computer-implemented method as recited in claim 1, further comprising determining an instance count for each recognized digital font-location type combination by aggregating a number of times each recognized digital font is used in digital images with a particular location type.

6. The computer-implemented method as recited in claim 5, wherein providing the location-based digital font recommendation comprises identifying a predetermined number of digital fonts having the highest instance counts for the content location type.

7. The computer-implemented method as recited in claim 1, wherein determining the location type of each digital image of the plurality of digital images comprises:
   identifying geographic coordinates from metadata associated with the digital image; and
   reverse geocoding the geographic coordinates to identify the location type.

8. The computer-implemented method as recited in claim 7, wherein determining the location type for each digital image further comprises:
   identifying a plurality of location subcategories associated with the location type, each location subcategory from the plurality of location subcategories corresponding to a geographic region; and
   selecting the location subcategory from the plurality of location subcategories for the digital image based on the location type and the determined location of the digital image.

9. The computer-implemented method as recited in claim 1, wherein:
   receiving an additional query comprising receiving a request to recognize a digital font in a digital image;
   identifying geographic coordinates from metadata associated with the digital image; and
   providing an additional location-based digital font recommendation to apply to the user-generated text content of the electronic document based on the mappings of the recognized digital fonts to the geographic coordinates from the metadata associated with the digital image.

10. A non-transitory computer-readable medium storing instructions thereon that, when executed by at least one processor, cause a computer system to:
   analyze, using image processing, a plurality of digital images comprising photographs captured by one or more image capture devices to recognize digital fonts of text in the photographs;
   determine locations of the digital images, the determined locations corresponding to geographic locations of content captured in the digital images;
   determine, for each digital image of the plurality of digital images, a location type corresponding to a location subcategory associated with the determined location of the digital image;
   generate mappings between the recognized digital fonts of the text in the photographs, the determined locations of the digital images, and location types corresponding to the location subcategory;
   receive, from a client device, a query for a digital font, the query being associated with an electronic document;

identify a content location type referenced within user-generated text content of the electronic document and a location of the client device used to generate the electronic document; and provide a location-based font recommendation to apply to the user-generated text content of the electronic document based on the mappings, the identified content location type, and the location of the client device by:

determining a digital font mapped to the content location type identified for the user-generated text content; and filtering a list of similar digital fonts to the digital font mapped to the content location type identified for the user-generated text content based on the similar digital fonts having a mapping to the content location type.

11. The non-transitory computer-readable medium as recited in claim 10, wherein the instructions, when executed by the at least one processor, cause the computer system to identify the content location type referenced within the user-generated text content of the electronic document by analyzing the user-generated text content of the electronic document using natural language processing to identify an instance of the content location type in the text of the electronic document.

12. The non-transitory computer-readable medium as recited in claim 10, further comprising instructions that, when executed by the at least one processor, cause the computer system to:

receive a selection of a digital font from the list of similar digital fonts; and download, from a remote server, the selected digital font.

13. The non-transitory computer-readable medium as recited in claim 12, wherein the instructions, when executed by the at least one processor, cause the computer system to identify the similar digital fonts by utilizing a font recognition algorithm to determine the similar digital fonts from a font-location database at the remote server.

14. The non-transitory computer-readable medium as recited in claim 10, wherein the instructions, when executed by the at least one processor, cause the computer system to determine the location type for each digital image by:

identifying a plurality of location subcategories associated with the location type, each location subcategory from the plurality of location subcategories corresponding to a geographic region; and selecting the location subcategory from the plurality of location subcategories for the digital image based on the location type and the determined location of the digital image.

15. The non-transitory computer-readable medium as recited in claim 10, further comprising instructions thereon that, when executed by the at least one processor, cause the computer system to:

determine an instance count for each recognized digital font-location type combination by aggregating a number of times each similar digital font is used in digital images with the content location type; and provide the location-based font recommendation by identifying a predetermined number of similar digital fonts having the highest instance counts for the content location type.

16. The non-transitory computer-readable medium as recited in claim 10, wherein the electronic document comprises a text file or an image file.

17. The non-transitory computer-readable medium as recited in claim 10, wherein the instructions that, when executed by the at least one processor, cause the computer system to determine that the user-generated text content references a geographic content location without explicitly reciting the content location type.

18. In a digital medium environment providing for location-based digital font recommendations, a system comprising:

at least one processor; and a non-transitory computer readable storage medium comprising instructions that, when executed by the at least one processor, cause the system to:

analyze, using object recognition image processing, a plurality of digital images comprising photographs captured by one or more image capture devices to recognize digital fonts of text in the photographs;

determine locations of the digital images, the determined locations corresponding to geographic locations of content captured in the digital images;

determine, for each digital image of the plurality of digital images, a location type corresponding to a location subcategory associated with the determined location of the digital image;

generate mappings between the recognized digital fonts of the text in the photographs, the determined locations of the digital images, and location types corresponding to the location subcategory;

receive, from a client device, a query for a digital font, the query being associated with an electronic document;

identify a content location type referenced within user-generated text content of the electronic document and a location of the client device used to generate the electronic document; and provide a location-based digital font recommendation to apply to the user-generated content of the electronic document based on the mappings, the identified content location type, and the location of the client device by:

determining a digital font mapped to the content location type identified for the user-generated text content; and filtering a list of similar digital fonts to the digital font mapped to the content location type identified for the user-generated text content based on the similar digital fonts having a mapping to the content location type.

19. The system as recited in claim 18, further comprising instructions that, when executed by the at least one processor, cause the system to:

receive user input identifying a selected digital font from the location-based digital font recommendation; and download the selected digital font to the client device.

20. The system as recited in claim 18, further comprising instructions that, when executed by the at least one processor, cause the system to provide the location-based digital font recommendation further cause the system to:

identifying a plurality of digital fonts having identified characteristics of the digital font in the digital image; and filtering the plurality of digital fonts based on whether the plurality of digital fonts have a mapping to the content location type and the location of the client device.

* * * * *